(12) United States Patent
Watts

(10) Patent No.: US 6,222,539 B1
(45) Date of Patent: Apr. 24, 2001

(54) EXTENDED HELP FEATURE FOR IMAGE FORMING DEVICES

(75) Inventor: Brian L. Watts, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/177,705

(22) Filed: Oct. 22, 1998

(51) Int. Cl.⁷ .............................. G06F 3/00; G06F 3/02; H04N 1/00
(52) U.S. Cl. .................. 345/336; 345/338; 345/168; 345/184; 399/81; 358/1.14; 358/406
(58) Field of Search ................... 345/336, 338, 345/337, 357, 356, 353, 352, 341, 970, 168, 123, 124, 172, 184; 399/2, 3, 4, 9, 18, 81; 358/1.13, 1.14, 1.15, 1.16, 442, 443, 406, 401, 441

(56) References Cited

U.S. PATENT DOCUMENTS

| | | | |
|---|---|---|---|
| 4,792,827 | * 12/1988 | Ogura | 399/81 |
| 5,363,204 | * 11/1994 | Millman | 358/406 |
| 5,539,499 | * 7/1996 | Fujisawa | 399/9 |
| 5,583,617 | * 12/1996 | Altrieth, III et al. | 399/81 |
| 5,768,657 | * 6/1998 | Kimura et al. | 399/81 |
| 5,950,045 | * 9/1999 | Nomura et al. | 399/81 |

\* cited by examiner

*Primary Examiner*—Raymond J. Bayerl

(57) ABSTRACT

An image forming device which includes extended help information available at the control panel of the image forming device using a combination of hardware and software or firmware to increase the functionality of the control panel. Dual functionality may be added to one of the selector switches on the control panel such as the item selector switch; a separate help button may be provided on the control panel; and in addition to the help button a visual indicator display such as a light emitting diode (LED) can be added to indicate the availability of help as well. A help symbol can also be displayed on the alphanumeric display panel such as a "?" to indicate the availability of help. Advantageously the help button is a rocker type switch which allows scrolling of the display and is geographically located on the control panel, such as immediately to the right of the display in a vertical orientation. Custom messages can also be installed within the image forming device to relay information to the end-user.

14 Claims, 5 Drawing Sheets

EXTENDED HELP FEATURE FOR IMAGE FORMING DEVICES

BACKGROUND OF THE INVENTION

1. Technical Field

This invention generally relates to image forming devices. More particularly, this invention relates to a method and apparatus for providing information to a user about the image forming device.

2. Background Art

Image forming devices such as laser printers, facsimile machines, inkjet printers, dot matrix printers, thermal printers and the like, have become extremely complex in terms of the number of features and capabilities available. As more and more features are included in these devices it becomes increasingly difficult to provide helpful information to the user in an efficient manner.

Most of these devices provide a display, usually a small alphanumeric LCD display of two short lines of text, in conjunction with the control panel to provide information to the user. A common implementation is to use a hierarchical menu system to allow the user to select help information based upon a particular feature or function of the device. As more and more features are added, the hierarchical menu structure becomes extremely complex and difficult to navigate. Additionally, it is difficult for the user to identify the particular feature or function for which help is needed. These difficulties are compounded by the limited size of the display which results in a very limited amount of information being available to the user. Often times a somewhat cryptic error message or warning message is displayed which forces the user to locate the device manual and translate the error message into an action to be performed by the user to place the device back in service.

The differences between an error message and a warning message are sometimes confusing to the user. Here, an error message is one which is displayed when an action is required by the user to place the device back in service. A warning message on the other hand is one which is displayed to alert the user to an impending condition which needs attention but which will not prevent immediate printing. Often when a warning message is displayed, the user will mistakenly believe that some action must be taken immediately when this is really not the case. However, because of the limited display functionality it is very difficult to differentiate between error messages which require immediate attention, and warning messages which are preventive or pro-active in nature.

It would be desirable to provide a help system at the control panel of the device which is easy to navigate, much more extensive in scope and even a help feature which can guide a user step-by-step through a correction or maintenance procedure.

DISCLOSURE OF THE INVENTION

The invention provides extended help information at the control panel of an image forming device using a combination of hardware and software or firmware to increase the functionality of the control panel. In one embodiment of the invention dual functionality is added to one of the selector switches on the control panel such as the item selector switch. In another embodiment of the invention, a separate help button is provided on the control panel. In addition to the provision of a help button, a visual indicator display such as a light emitting diode (LED) can be added to indicate the availability of help as well. In some other embodiments of the invention, a help symbol is displayed on the alphanumeric display panel such as a "?" to indicate the availability of help. The help symbol can be duplicated in permanent indicia on or near the help button on the control panel. This correlation helps the user to identify which button to press to activate help.

In some embodiments of the invention, whether a separate button is provided or one of the existing buttons is used, a rocker type switch is used which allows scrolling of the display. Advantageously this button is geographically located on the control panel, such as immediately to the right of the display in a vertical orientation, at least in the case where a separate help scrolling switch is provided. Printer control circuitry is provided to monitor the state of the help switch whether this is a separate switch or a dual function switch. The printer control circuitry includes programming to display messages, help information as well as graphical indicia to aid the user to both navigate and to understand the help information.

In some embodiments of the invention, the printer control circuitry is programmed to display error messages and warning messages differently. For example, during normal printing the display a might display message such as "Ready". If a low toner condition were detected the display might alternate between "Ready" and "Toner Low ?", with the "?" indicating that help is available to help the user replace the depleted consumable. An error message on the other hand, such as a paper jam, would be displayed differently. In this case the standard error message such as "13.1 Paper Jam" would be displayed on the alphanumeric display and might alternate with a displayed message such as "Check Middle Front Drawer" which may in turn alternate with a message such as "For Help Press The ? Key". Displaying the standard "13.1 Paper Jam" message allows the experienced user who is already familiar with this message to proceed directly to the area of the image forming device to fix the problem. The intermediate message "Check Middle Front Drawer" allows a somewhat less experienced user to identify the problem area in the image forming device and fix the problem without further instruction. Finally, the extended help feature allows a novice user to obtain the information about both locating and fixing the problem.

In yet another embodiment of the invention, custom messages can be installed within the image forming device to relay information to the end-user. For instance, in a large organization a system administrator may have a specific procedure which the organization's employees must follow when a consumable is replaced in the image forming device. This procedure might include documenting the date, time and type of consumable as well as information about where and how the consumable is procured. All of this information can be displayed in a customized message which is a subset of the standard toner low message. Advantageously, custom messages may be up loaded to a networked image forming device by the system administrator across the network.

The invention enables a number of advantages which include: 1) Putting help at the user's fingertips and thus eliminating the need for the user to locate the manual to decipher a cryptic error or warning message; 2) The advantage that help messages can be of virtually unlimited size and formatted to fit even small displays by providing scrolling error messages; 3) Allowing the user to read and review messages at their own speed via a scroll key; and 4) Providing sequential procedural instructions to the user to guide the user step-by-step through whatever process is necessary to place the image forming device back in service.

DETAILED DESCRIPTION OF THE INVENTION

Figure 1:
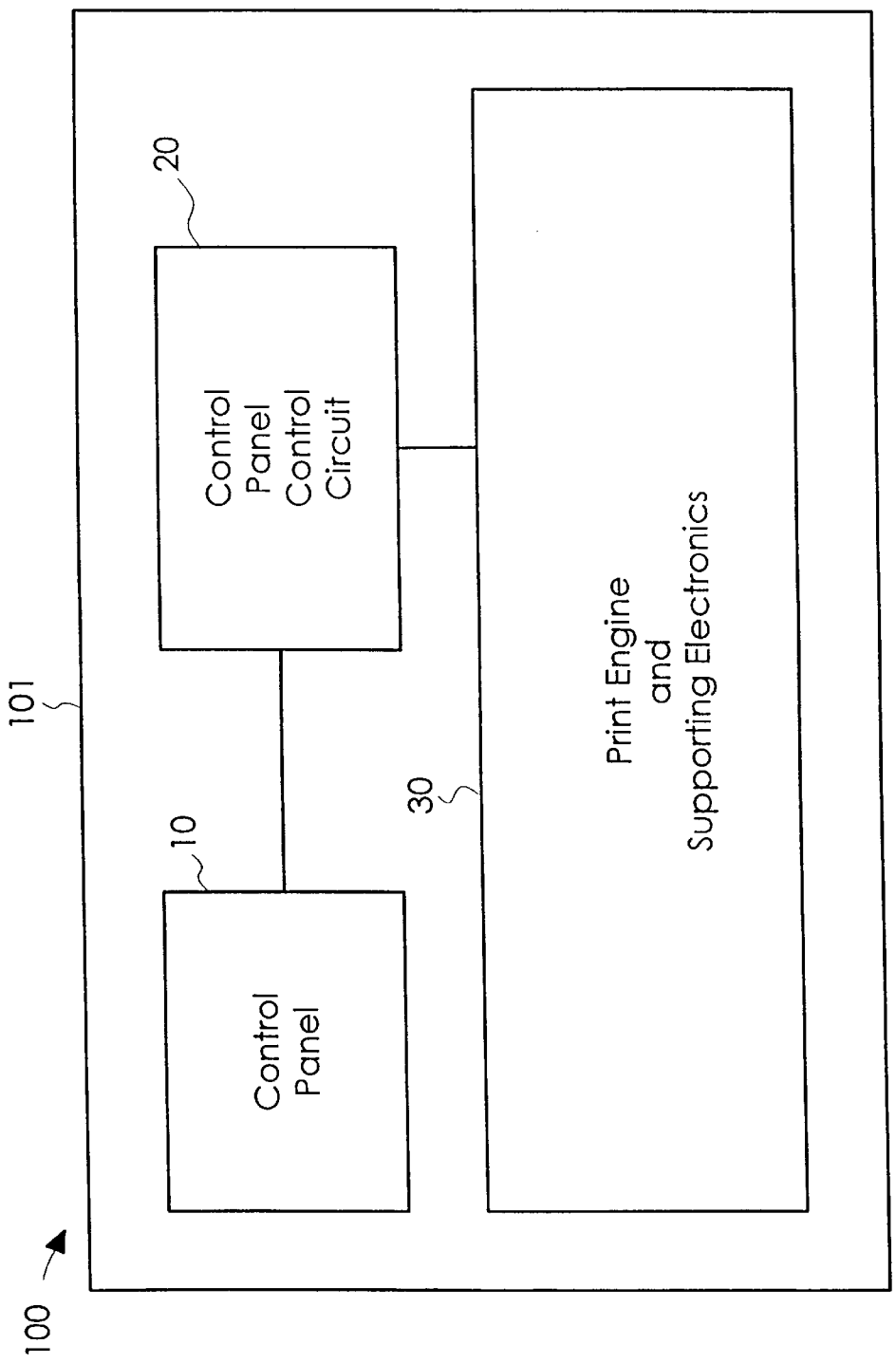
FIG. 1 is a schematic view of an image forming device in which the invention may be implemented.

Referring to the figures, an image forming device 100 having an extended help feature according to the invention is illustrated and will be explained in detail in the following description. Image forming device 100 includes a control panel according to the invention generally designated as 10. Control panel 10 may include: three rocker type switches corresponding to a menu selector switch 11, an item selector switch 12 and a value selector switch 13; a job cancel push-button 15; and a go button 16, all mounted within control panel support surface which can form part of the housing for the image forming device. Menu selector switch 11, item selector switch 12 and value selector switch 13 are arranged in an intuitive hierarchical fashion with the selectors corresponding to higher level features and menus placed higher in the control panel layout hierarchy than lower level selectors. The separate job cancel button 15 is provided to allow independent selection of that feature.

The opposing ends of menu selector rocker switch 11 may be provided with direction indicating indicia such as arrows or chevrons indicating forward and backward directions corresponding to the directions through which a user can traverse the menu hierarchy. Menu selector 11 represents a first hierarchical bi-directional selector in the sense that it allows the user to traverse the first level of the image forming device's feature selection menu system. When either end of menu selector switch 11 is depressed, control panel circuit 20 usually automatically places image forming device 100 in the off-line programming state, displays the first menu, on alphanumeric display 17 and allows a user to advance through the various menus in both forward and backward directions by additional depressions of either end of switch 11.

Similarly, the opposing ends of item selector rocker switch 12 may be provided with direction indicating indicia to indicate the opposing directions through which the user can proceed through the item list within a given menu. Item selector 12 represents a second hierarchical bi-directional selector in the sense that it allows the user to traverse the second level of the image forming device's feature selection menu system, this level corresponding to the items within the menus of the first level. Control panel circuit 20 detects depressions of either end of item selector switch 12 and allows a user to proceed in both forward and backward directions through the list of items within a selected menu displayed on alphanumeric display 17. Value selector rocker switch 13 allows the user to increment or decrement the value of a menu item selected with item selector 12. Value selector 13 is a bi-directional increment and decrement selector in the sense that it allows a user to change the value of a particular item either up or down in given increments. The opposing ends of value selector switch 13 may be provided with indicia indicating increment and decrement functions, such as the plus sign on one end and the minus sign on the other. Control panel control circuit 20 detects a depression of either end of value selector switch 13 and increments or decrements the temporary register value of the selected menu item.

Go or on-line switch 16 is a momentary push-button switch in this embodiment and allows a user to accomplish several functions. When image forming device 100 is in the on-line state, activation of go switch 16 will toggle the image forming device to the off-line state. When image forming device 100 is in the off-line/programming state, activation of go switch 16 allows image forming device 100 to reenter the on-line state after having entered the off-line state. In this embodiment, activation of go switch 16 may also clear clearable warnings displayed on display 17, may act as a form feed when data is present in image forming device 100 and may toggle the image forming device between power save and normal on-line modes.

Similarly, job cancel switch 15 is, in this embodiment, a momentary push-button switch which allows the user to cancel the current print job, stopping printing and clearing the print buffer(s) of data representing the canceled job. Control panel circuit 20 also detects activation of go switch 16 and job cancel switch 15 to track the states of the various registers, to update registers, to display the current state as well as the current selected item and/or menu on a visual indicator device such as alpha numeric display panel 17 and to communicate with print engine 30 of image forming device 100.

While control panel control circuit 20 and print engine 30, including supporting electronics such as a formatter and a printer controller, are illustrated as separate entities within image forming device 100 shown in FIG. 1, it should be noted that one or more of these entities can, and likely are, integrated into a single entity. For example, in practicing the invention, control panel circuit 20, a formatter and a printer controller have been integrated into a single entity. FIG. 1 illustrates an image forming device 100, such as a laser printer, having control panel 10 incorporated therein and operatively connected to control panel control circuit 20 and print engine 30, all within housing 101.

Figure 2:
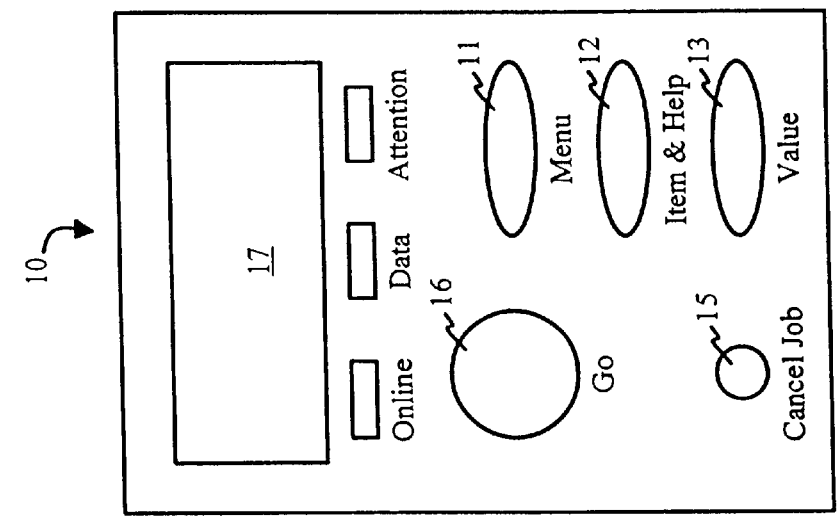
FIG. 2 is a schematic view of an image forming device control panel according to a first embodiment of the invention.

FIG. 2 illustrates a first embodiment of the invention which incorporates dual functionality of item rocker switch 12. In this embodiment rocker switch 12 is both an item selection switch and a help switch. If help is available for the particular warning or error message displayed on display 17 a depression of item and help switch 12 will result in a help message being displayed. By pressing opposing ends of switch 12 the user can scroll through a lengthy message if necessary. The help mode is exited by a depression of go button 16. Additionally control circuit 20 can be configured so that after a predetermined amount of time passes the help mode is automatically exited.

Figure 3:
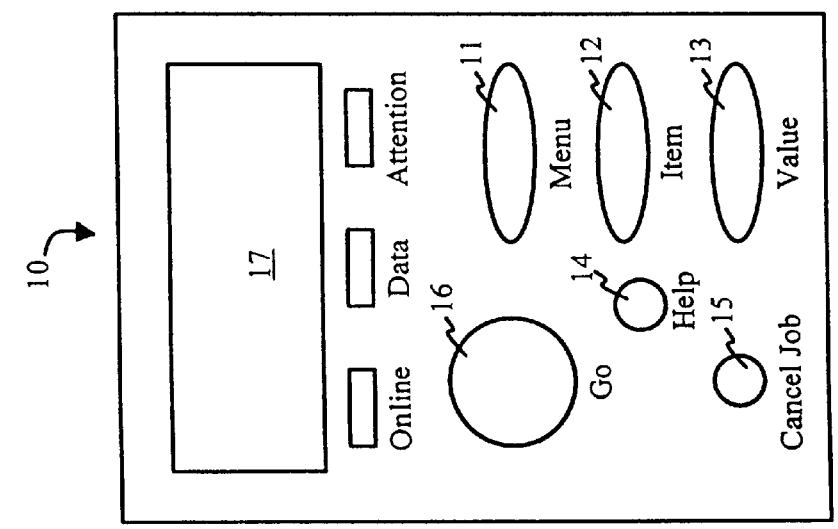
FIG. 3 is a schematic view of an image forming device control panel according to a second embodiment of the invention.

FIG. 3 illustrates a second embodiment of the invention which incorporates a separate help push button 14. Here push button 14 is a momentary push button switch. A single depression of push button 14 will place image forming device 100 in the help mode. Additional depressions of push button 14 advance the displayed message ahead a predetermined number of lines. For example, using the two line display illustrated, additional depressions the push button 14 will advance the display two lines at a time. A depression of push button 14 after the last displayable line text will exit the help mode.

Figure 4:
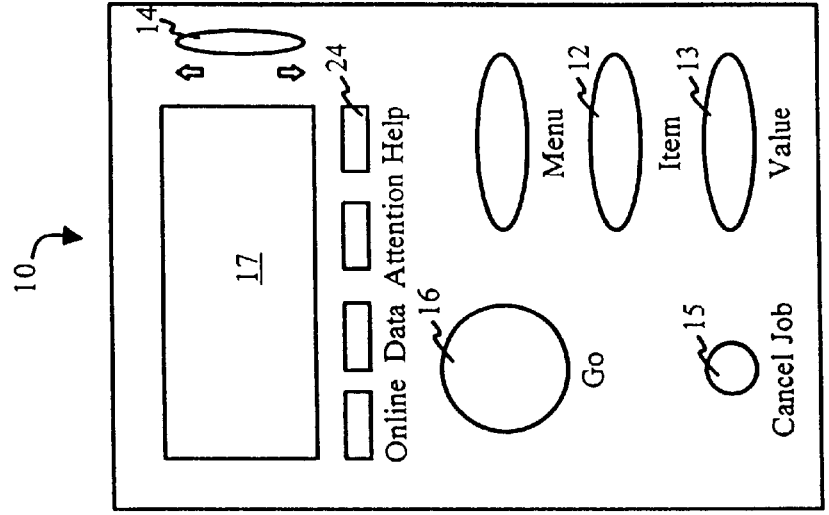
FIG. 4 is a schematic view of an image forming device control panel according to a third embodiment of the invention.

FIG. 4 illustrates a third embodiment of the invention which also incorporates a separate help rocker switch 14. Advantageously rocker switch 14 is positioned in a vertical orientation to the right side of display 17. If help is available for the particular warning or error message displayed on display 17 a depression of help switch 14 will result in a help message being displayed on display 17. By pressing opposing ends of switch 14 the user can scroll up or down through the message. FIG. 4 also illustrates a help availability indicator 24 such as an LED. Indicator 24 will light when help is available for the particular warning or error message shown. It should be noted that audible indicators can be used in addition to or instead of a visual indicator.

Figure 5A:
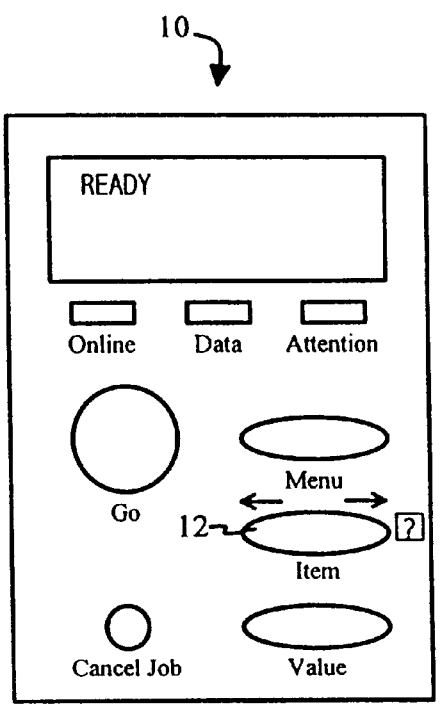
FIGS. 5A–5L are schematic views of an image forming device control panel according to a fourth embodiment of the invention.
Figure 5B:
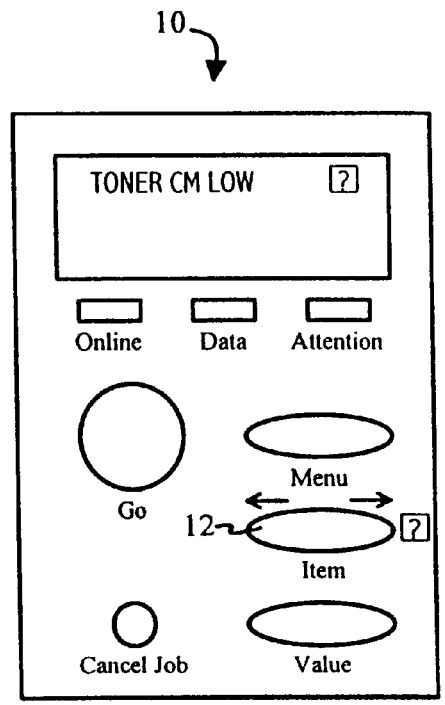
Figure 5C:
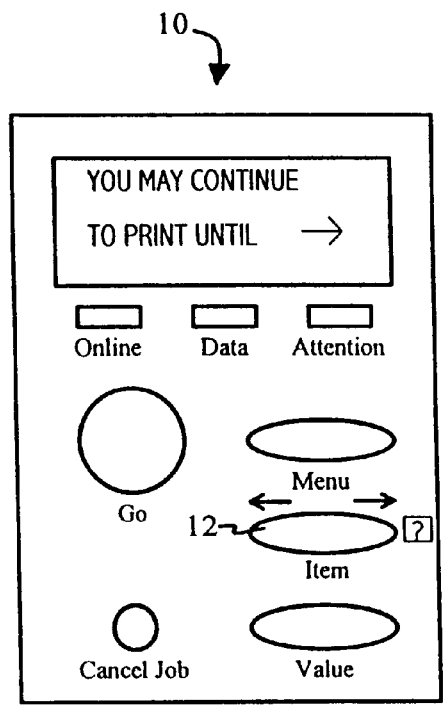
Figure 5D:
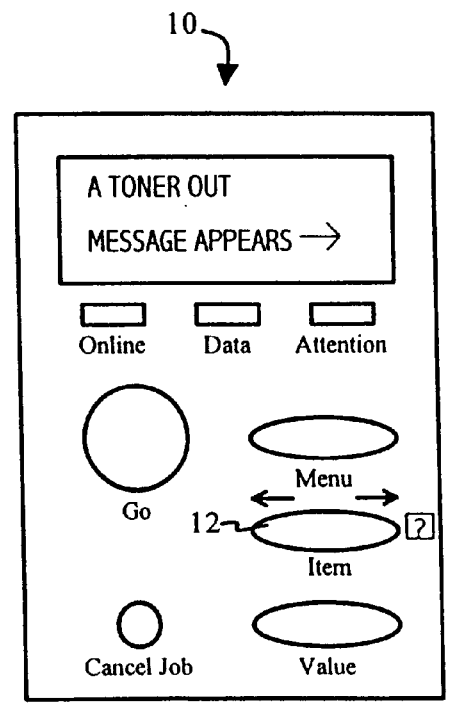
Figure 5E:
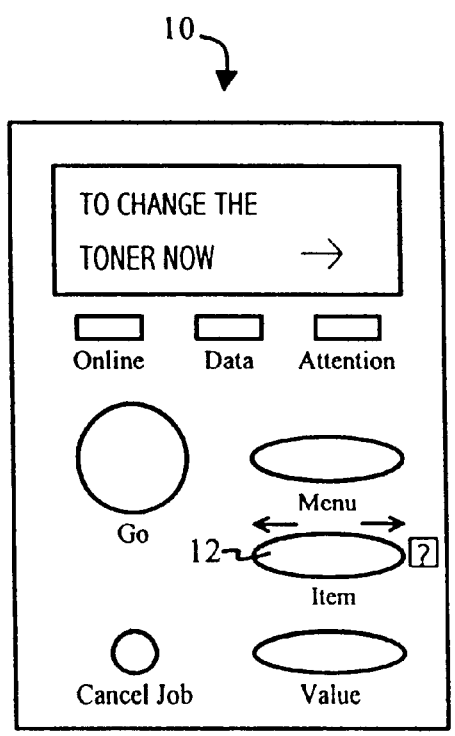
Figure 5F:
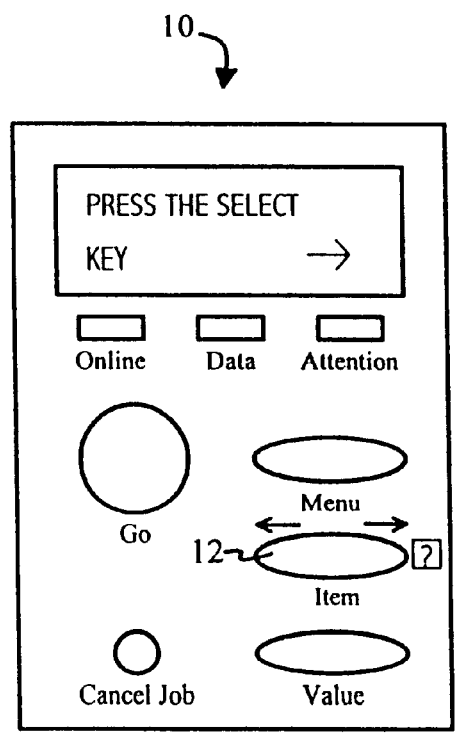
Figure 5G:
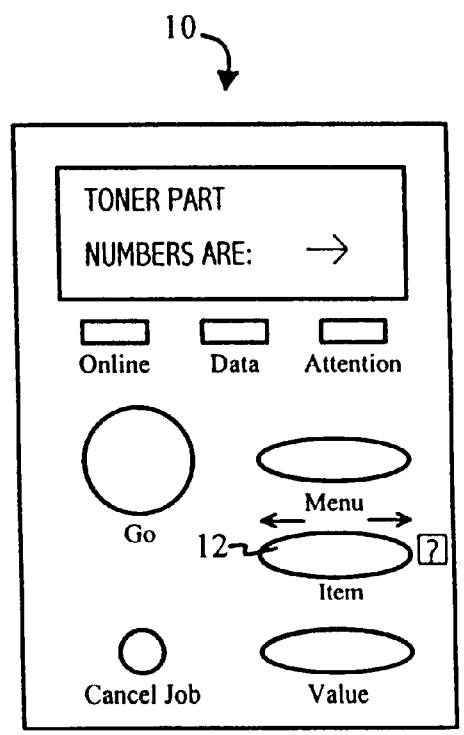
Figure 5H:
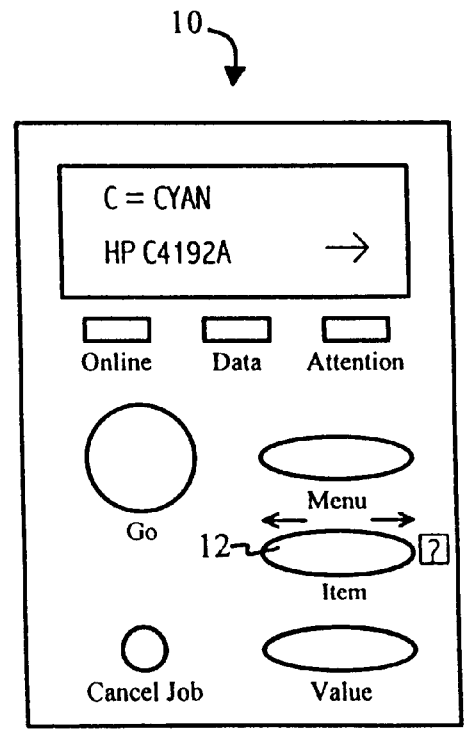
Figure 5I:
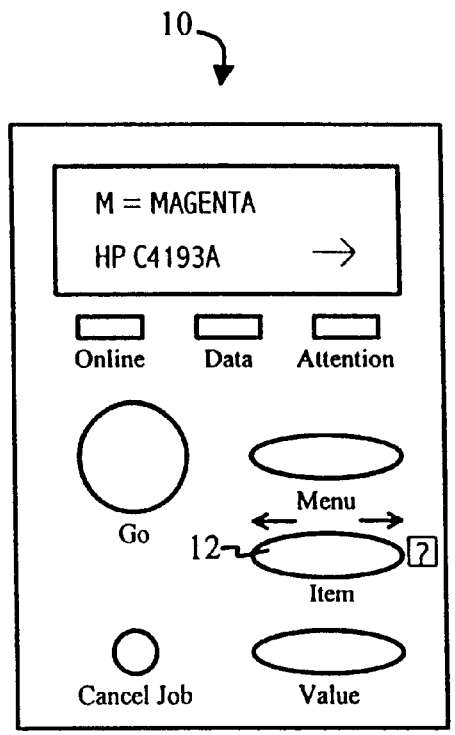
Figure 5J:
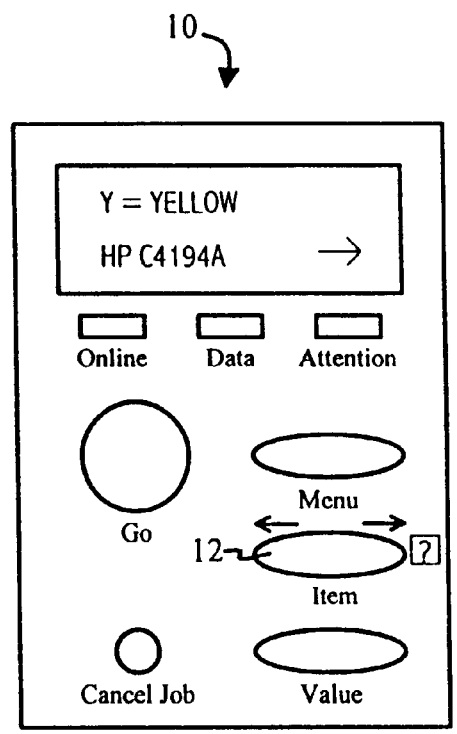
Figure 5K:
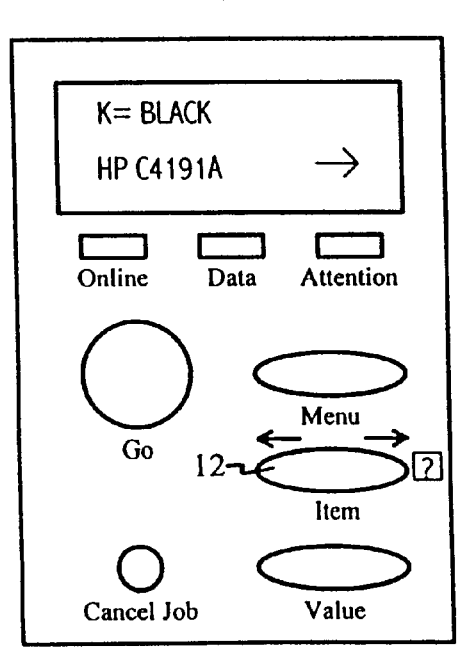
Figure 5L:
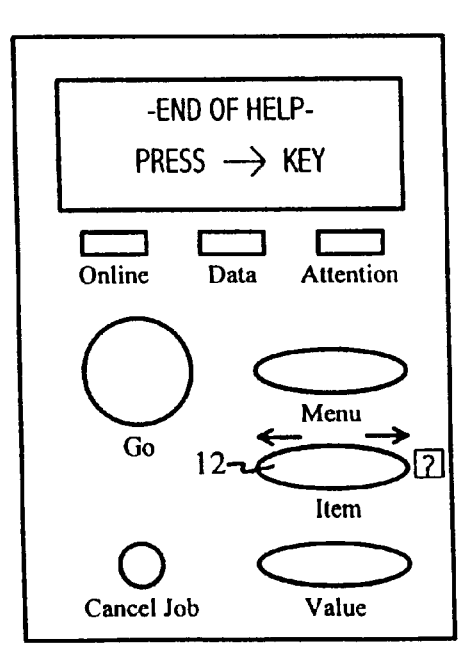

FIGS. 5A–5L illustrate a sequence of control panel displays as a result of a low toner warning message. Once control panel circuit 20 receives a low toner indicator signal, typically from either the print controller or the print engine, display 17 will alternate between the messages shown in FIG. 5A and FIG. 5B. As can be seen in FIG. 5B display 17 includes a help availability indicator which is here a "?". The "?" is duplicated in permanent indicia directly to the right side of item selector switch 12. When help is available, as is the case in this example, a depression of selector switch 12 places image forming device 100 in the help mode which is reflected in FIG. 5C. The message displayed in FIG. 5C includes direction indicating indicia, in this case a small arrow pointing to the right, to indicate to the user that additional information is available. The right hand pointing arrow may correspond with the direction indicating indicia associated with item selector switch 12. FIGS. 5C–5L illustrate the result of sequential depressions of the right hand side of item selector switch 12. If desired, depressions of the left-hand side of item selector switch 12 can scroll the displayed message in the reverse direction.

While there are shown and described various embodiments of the invention, it is to be distinctly understood that this invention is not limited thereto but may be variously embodied to practice within the scope of the following claims. It will therefore be understood that modifications and variations are possible without departing from the scope of the invention as expressed in the following claims. It should also be noted that the various features and embodiments can be combined with these and other features without departing from the scope of the invention.

I claim:

1. A control panel for an image forming device which comprises:
    an electronic display;
    a help switch configured as a help switch;
    a help availability visual indicator responsive to a control panel control circuit; and
    the control panel control circuit operatively connected to the display and the help switch, where the control panel control circuit is configured to display help information on the display and to scroll the help information as a result of activation of the help switch.

2. The control panel of claim 1 wherein the display is a multi-character, multi-line display.

3. The control panel of claim 1 wherein the help switch is a momentary push button switch and the control circuit is further configured to scroll the help information as a result of subsequent depressions of the help switch.

4. The control panel of claim 3 wherein the display is a multi-character, multi-line display.

5. The control panel of claim 1 wherein the help switch is a momentary push button switch and the control circuit is further configured to scroll the help information as a result of subsequent depressions of the help switch.

6. The control panel of claim 5 wherein the display is a multi-character, multi-line display.

7. The control panel of claim 1 wherein the display is a multi-character, multi-line display.

8. An image forming device which comprises:
    a housing;
    a print engine within the housing;
    a control panel control circuit within the housing and operatively attached to the print engine; and
    a control panel affixed to the housing, the control panel including:
        an electronic display;
        a rocker switch configured as a help switch;
        a help availability visual indicator responsive to the control panel control circuit; and
        the control panel control circuit operatively connected to the display and the help switch, where the control panel control circuit is configured to display help information on the display and to scroll the help information as a result of activation of the help switch.

9. The image forming device of claim 8 wherein the display is a multi-character, multi-line display.

10. The image forming device of claim 8 wherein the help switch is a momentary push button switch and the control circuit is further configured to scroll the help information as a result of subsequent depressions of the help switch.

11. The image forming device of claim 10 wherein the display is a multi-character, multi-line display.

12. The image forming device of claim 8 wherein the help switch is a momentary push button switch and the control circuit is further configured to scroll the help information as a result of subsequent depressions of the help switch.

13. The image forming device of claim 12 wherein the display is a multi-character, multi-line display.

14. The image forming devices of claim 8 wherein the display is a multi-character, multi-line display.

* * * * *